May 13, 1924.

R. J. MJAHICE 1,493,693

AUTOMOBILE SIGNAL DEVICE

Filed May 24, 1923　　2 Sheets-Sheet 1

Inventor
Ristum J. Mjahice

By

Attorney

May 13, 1924.
R. J. MJAHICE
1,493,693
AUTOMOBILE SIGNAL DEVICE
Filed May 24, 1923      2 Sheets—Sheet 2
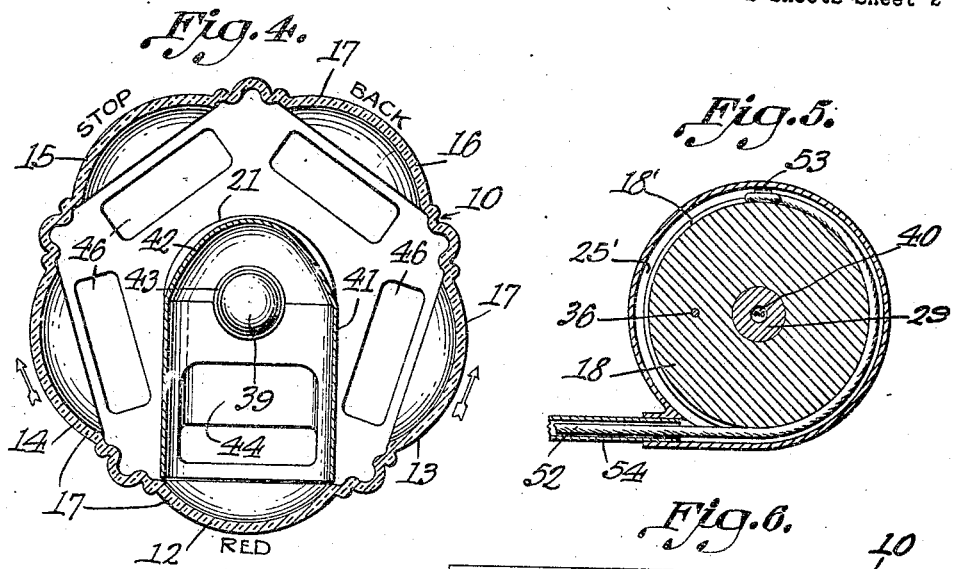
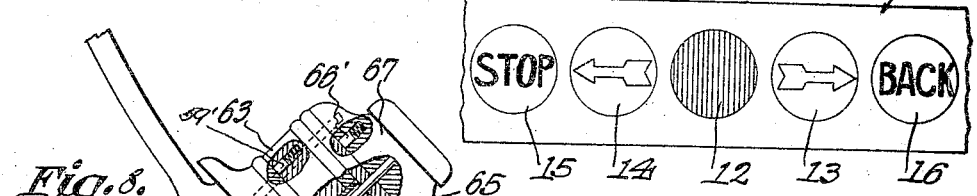
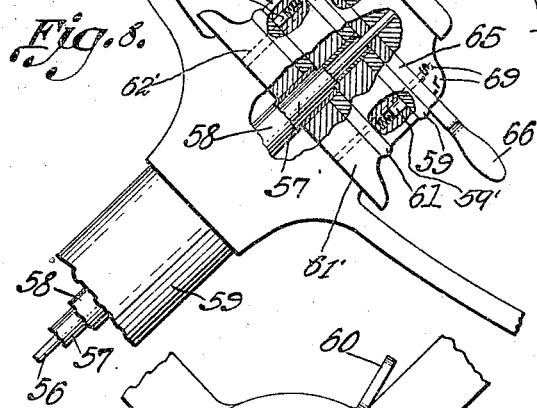
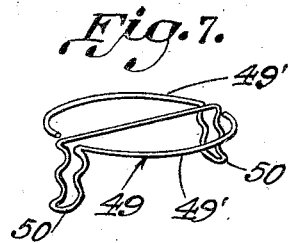
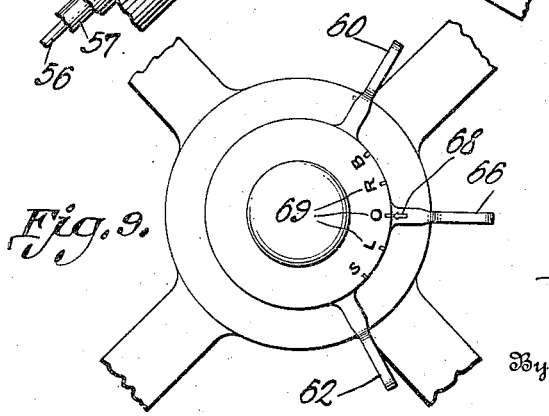
Inventor
Ristum J. Mjahice
By
Attorney Patented May 13, 1924.

1,493,693

UNITED STATES PATENT OFFICE.

RISTUM J. MJAHICE, OF CAMBRIDGE, OHIO.

AUTOMOBILE SIGNAL DEVICE.

Application filed May 24, 1923. Serial No. 641,198.

*To all whom it may concern:*

Be it known that I, RISTUM J. MJAHICE, a citizen of the United States, residing at Cambridge, in the county of Guernsey and State of Ohio, have invented certain new and useful Improvements in Automobile Signal Devices, of which the following is a specification.

My invention relates to a visual signal device, adapted for use in connection with automobiles, or other vehicles, for indicating the several operations about to be performed, or being performed, by the driver.

An important object of the invention is to provide a device of the above mentioned character, which is compact, relatively small, neat and attractive in appearance, and which may be conveniently actuated by the driver, for indicating the operating conditions, such as "stop", "right turn", "left turn" or "backing".

A further object of the invention is to provide a device of the above mentioned character, which in the neutral position, will provide the usual tail light, and will also project light upon the license plate.

A further object of the invention is to provide a device of the above mentioned character, formed of few parts, which are assembled in a manner to prevent rattling.

A further object of the invention is to provide a device of the above mentioned character, so constructed that the operating parts thereof are introduced into and removed from the casing of the device, from the upper end thereof, whereby such operating parts are covered in use, being protected from rain, etc.

Other objects and advantages of the invention will be apparent during the course of the following description.

Figure 1:
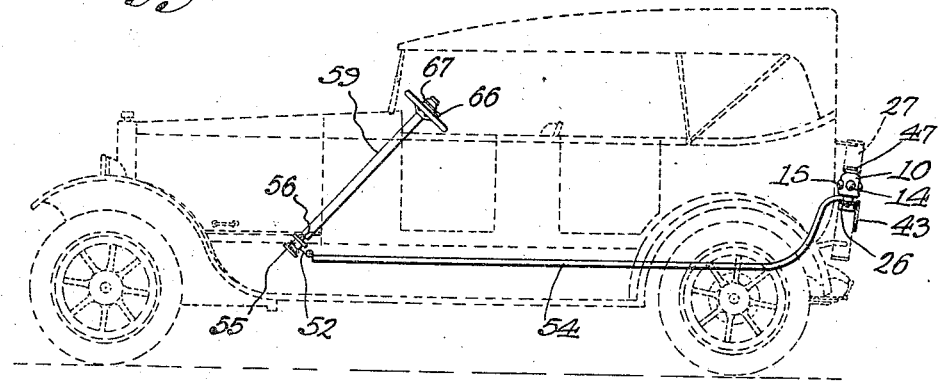
Figure 2:
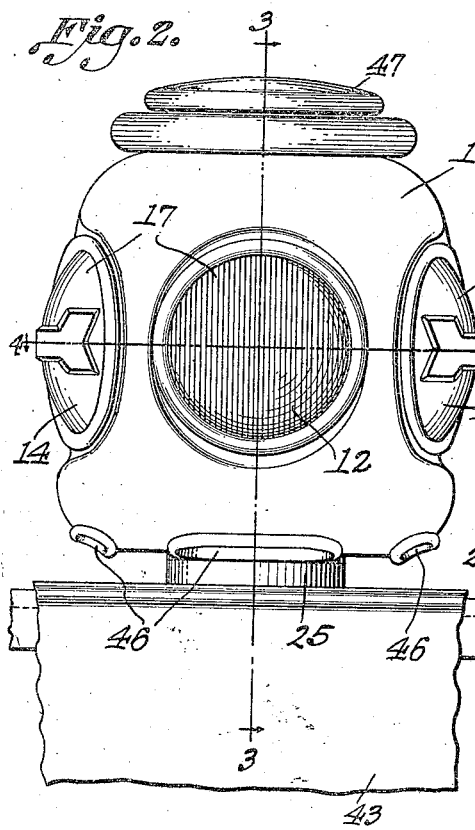
Figure 3:
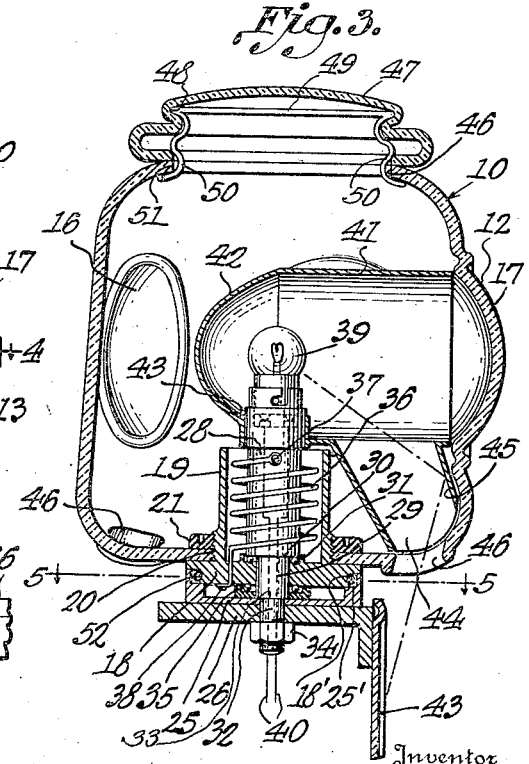

In the accompanying drawings forming a part of this specification, and in which like numerals are employed to designate like parts throughout the same, Figure 1 is a side elevation of a device embodying my invention, showing the same applied to an automobile, Figure 2 is an end elevation of the device, Figure 3 is a transverse vertical sectional view taken on line 3—3 of Figure 2, Figure 4 is a horizontal sectional view taken on line 4—4 of Figure 2, Figure 5 is a horizontal sectional view taken on line 5—5 of Figure 3, Figure 6 is a diagrammatic view showing the several signal elements, Figure 7 is a perspective view of a clamp for detachably securing the top to the casing, Figure 8 is a side elevation of the manually operated actuating element, and, Figure 9 is a plan view of the same.

In the drawings, wherein for the purpose of illustration is shown a preferred embodiment of my invention, the numeral 10 designates a substantially vertical casing, which is preferably formed of glass, although I contemplate forming the same of metal, or any other suitable material. It is preferred to form this casing of glass, of suitable thickness and toughness, on account of the ease and cheapness with which this element may be cast. Formed integral with this casing 10 are signal elements 12, 13, 14, 15 and 16. These signal elements embody preferably outwardly bulging circular portions 17, upon which are formed or molded the signal characters. The signal element 12 is preferably formed of plain or transparent glass, preferably colored red, as is the usual color employed for the tail light of an automobile, but of course the invention is not restricted to this particular color. The signal element 13 is provided with an arrow, pointing to the right, the signal element 14 with an arrow pointing to the left, the signal element 15 with the word "Stop" and the signal element 16 with the word "Back". These arrows and words are preferably cast upon the elements, and are slightly raised. The casing 10 exteriorly of the several signal elements is preferably rendered opaque, by any suitable means, such as coloring the glass black, or by painting the glass interiorly or exteriorly. The signal elements 13, 14, 15 and 16, exteriorly of the characters thereon, are also rendered opaque by suitable means, whereby the light is caused to shine through the characters, which are preferably of a light color, such as red. As above stated, the signal element 12 is formed of transparent colored glass, preferably red. The invention is in no sense restricted to having the signal elements of any particular color, as obviously they may be made of light color, such as white, whereby they would be readily visible in the day, without illumination.

The casing 10 is rotatable, for bringing the selected signal element into the rearmost position, for observation, and means are provided to rotatably support this casing. Such means embodies a base or plate 18, Figure 3, carrying an upwardly projecting vertical sleeve 19, preferably formed integral therewith. This sleeve extends through an opening 20 formed in the bottom of the casing 10, and is exteriorly threaded, for engagement with a ring-nut 21, preferably formed of hard rubber. By this means the bottom of the casing 10 is clamped to the base 18. A coacting base 25 is clamped to a transverse bar 26, carried by the tire rack 27. The bar 26 is horizontally arranged at the rear of the automobile, as is well known.

The numeral 28 designates an inner sleeve or tube extending vertically through the sleeve 19, in concentric relation thereto. The sleeve 28 has an intermediate reduced portion 29 forming a shoulder 30, engaging a ball bearing 31, held between this shoulder and the upper base 18. The sleeve 28 has an outer further reduced portion 32, providing a shoulder 33, engaging the lower base 25 and adapted to clamp the same to the bar 26, this reduced portion 33 being exteriorly screw-threaded for the reception of a nut 34, engaging beneath the bar 26. A ball bearing 35 surrounds the intermediate portion 29 of the sleeve and engages with the lower face of the upper rotatable base 18.

Disposed within the space between the outer sleeve 19, and the inner sleeve 28 is a tortional coil spring 36, one end of which is secured to the inner stationary sleeve 38, as shown at 37, and the other end of which extends through an opening formed in the rotatable base 18 and is secured to the lower side thereof, as shown at 38. This spring is tensioned whereby it will turn the casing 10 in one direction to bring the extreme signal element 15 to the display position, the turning movement of the casing for displaying the other signal elements, in a reverse direction, being effected by manually operated means, against the tension of the spring. This manually operated means will be described hereinafter.

The inner sleeve 28 is provided at its upper end with the usual socket for the reception of the shank of an electric bulb 39, of the usual construction, the terminals of this bulb engaging contacts having connection with insulated wires 40, extending through the sleeve 28, and connected with a suitable source of current.

The numeral 41 designates a light guard and reflector, which may be formed of metal, and the inner surface of which may be polished. This light guard extends radially within the casing 10 with its outer end open and its rear end 42 closed, and preferably in the form of a parabolic reflector. The guard 41 is provided in its lower side with a sleeve 43, to fit tightly upon the sleeve 28, whereby the guard 41 will not turn thereon, there being sufficient frictional engagement between these parts for affording a clamping connection, but further clamping means may be provided, if desired. The guard 41 is stationary, and its outer end is arranged in close proximity to the signal element, when moved in alinement therewith, whereby the light passing through the outer end of the guard is directed substantially entirely through the active signal element. In order that a proper amount of light may be supplied to the license plate 43, which is secured to the bar 26, the guard 41 is provided in its bottom portion with an angularly arranged depending tubular extension 44, the inner surface of which is preferably polished for reflecting the light. This tubular extension has a reflecting surface 45, arranged at a proper angle, for reflecting some of the light through the tubular extension 44, to the license plate 43, as clearly shown in Figure 3. The bottom of the casing 10 is provided with elongated openings 46, corresponding in number and arrangement to the signal elements, and hence when each selected signal element is in use, the light will be supplied to the license plate.

The top of the casing 10 is provided with a relatively large opening 46, through which the several interior operating elements of the device are passed. This opening is adapted to be covered by a top 47, also preferably formed of glass, although any othr suitable material, such as metal, may be employed. This top is provided with an interior annular groove 48, for the reception of the annular body portion 49 of a locking clamp, having resilient radial fingers 50, for engagement with flanges 51, formed on the top of the casing 10, at the opening 46. This annular body portion embodies curved resilient segmental parts 49', which may be circumferentially contracted, and will contract when passing the rib adjacent to the annular groove 48, and subsequently expand within this groove.

I will now describe the manually operated means for turning the casing 10 in one direction, in opposition to the spring 36. This means embodies a flexible element or cable 52, Figures 3 and 5. One end of this cable extends within a groove 18', formed upon the periphery of the base 18 and a groove 25', formed in the top of the base 25. As more clearly shown in Figure 5, the rear end of the flexible element is attached to the base 18 at 53. The flexible element 52 extends from the base 18, at a tangent, and passes through a tube or housing 54, suitably secured to the automobile, and leading to the forward end thereof, and terminating in proximity to the steering column. The tube 54 has its rear end attached to the lower base 25, as clearly shown in Figure 5. At its forward end, the flexible element or cable 52 is connected with and wound upon a drum 55, which is rigidly mounted upon a rod or shaft 56. As more clearly shown in Figures 8 and 9, this rod or shaft 56 is rotatable within an inner tube or shaft 57, in turn rotatable within an outer tube 58, the outer tube being rotatable within a steering column 59, as is well known in the art. The tube 57 carries a head in 59, turned by a lever 60, and this tube may be employed to regulate the spark, and the tube 58 carries a head 61, turned by a lever 62, and employed to regulate the gas. A block 63 is arranged between the heads 59 and 61 carrying spring pressed plungers 59', which frictionally engage with these heads to retard their movement or prevent accidental rotation. The rod 56 extends upwardly beyond the tube 57 and has a head 65 rigidly secured thereto, turned by a lever 66, arranged between the levers 60 and 62. The head 65 is engaged by spring pressed plungers 66', carried by a head 67, and this head 67 is loosely mounted upon the upper end of the rod 56, but cannot move longitudinally thereof. The function of the plungers 66' is to form friction means for holding the head 65 against improper turning movement, the friction being sufficient to prevent the spring 36 from turning the head 65. The gas and spark levers illustrated in Figures 8 and 9, is a modification of such levers found upon the Nash automobile. In the Nash construction there is a base 61', above the steering wheel, which is stationary. The Nash construction is somewhat modified, and I have mounted pins 62', anchored in the base 61', and projecting through segmental slots formed in the heads 59, 61 and 65, these pins extending through circular openings in the block 63 and also serving to hold it against rotation. I prefer to mount the control lever 66 between the levers 60 and 62, as shown, but the invention is in no sense restricted to this arrangement. A pivoted lever may be mounted at any suitable point on the automobile, and suitably connected with the cable 52, to effect its longitudinal movement. The lever 66, Figure 9, is provided at its top with a pointer 68, traveling in proximity to characters 69, which may be "S", "L", "0", "R", "B", indicating "stop", "left", "zero or neutral", "right" and "back" respectively.

The operation of the device is as follows: With the lever 66, Figure 9, in the neutral position, the tail-light signal element 12 will be in the active position. If it is desired to indicate a left-hand turn, the lever 66 is advanced to the left so that the pointer 68 registers with "L", the cable is unwound from the drum 55 and the casing 10 is turned clock-wise by the spring 36 so that the signal element 14 is brought to the active position, opposite the guard 41. The light will now shine through and illuminate the signal element 14, pointing to the left. If it is desired to give a "stop" signal, the lever 66 is advanced further to the left so that the pointer 68 is moved in alinement with "S". When the lever 66 is moved to the right, Figure 9, to the neutral position, the cable is wound upon the drum 55 and will turn the casing 10 counter clock-wise. If it is desired to give a "right" signal, the lever 66 is swung to the right to bring the pointer 68 adjacent to "R". The cable is further wound upon the drum and turns the casing 10, counter clock-wise, to advance the signal element 13 to the active postion at the open end of the guard 41, for producing a "back" signal, the signal lever 66 is moved to the "B" point.

While I have shown and described manually operated means for rotating the signal element, yet it is obvious that the invention is in no sense restricted to such means. I contemplate employing electrical means to rotate or turn the signal element, and the same is regarded as within the scope of the invention.

It is to be understood that the form of my invention herewith shown and described is to be taken as a preferred example of the same, and that various changes in the shape, size, and arrangement of parts may be resorted to without departing from the spirit of my invention or the scope of the subjoined claims.

Having thus described my invention, I claim:

1. In an automobile signal device, a substantially vertical rotatable casing provided upon its side with a plurality of light transmitting signal elements, said casing being provided in its bottom with opening corresponding in number and arrangement to the signal elements, means for supporting the casing upon an automobile in proximity to the license plate, a relatively stationary support within the casing, a source of light carried by the support, a light guard mounted upon the support and projecting radially therefrom with its open end so positioned that a selected signal element may be shifted in close proximity to and across the same, said light guard having a lateral tubular extension adapted for conducting some of the light to a selected opening in the bottom of the casing to the license plate, and means to turn the casing.

2. In an automobile signal device, a lower relatively stationary base, an upper base provided with an upwardly extending sleeve, a relatively stationary support secured to the lower base and serving to pivotally connect the upper base to the lower base, a casing having an opening for receiving said sleeve, means for clamping the casing to the upper base, a plurality of signal elements carried by the side wall of the casing, a light guard mounted upon the relatively stationary support and projecting laterally toward the side wall of the casing, a source of light mounted within the light guard upon said support, and means to turn the upper base.

3. In an automobile signal device, a lower relatively stationary base, an upper rotatable base provided with a substantially vertical sleeve, a relatively stationary support extending through said sleeve and bases and serving to pivotally connect said bases, a source of light mounted upon the relatively stationary support, a casing having an opening to receive the sleeve and clamped to the upper base, signal elements carried by the side of the casing, a light guard mounted upon the relatively stationary support and extending laterally toward the side of the casing, manually operated means to turn the casing in one direction, and a spring surrounding the relatively stationary support within the sleeve and having one end thereof connected with the support and its opposite end with the upper base.

4. In an automobile signal device, a lower base, an upper rotatable base, said bases being provided with an enclosed curved groove, a relatively stationary support pivotally connecting the upper base with the lower base, a source of light mounted upon the support, a light guard mounted upon the support and projecting radially therefrom, a casing mounted upon the upper base and provided upon its side with a plurality of signal elements, a torsional coil spring connecting the upper base and support, a flexible element connected with the upper base and operating within the curved groove, and means to move the flexible element longitudinally in one direction.

5. In an automobile signal device, an upstanding integral casing formed of glass and having light transmitting signal elements cast integral with the side wall thereof, said casing also having openings in its bottom corresponding in number and arrangement to the signal elements, a source of light within the casing, a light guard surrounding the source of light and adapted to supply the light to the selected signal element and bottom opening, such bottom opening being adapted to supply the light to a license plate or the like and means to turn the casing.

6. In an automobile signal device, a substantially vertical relatively stationary sleeve, a rotatable base pivoted upon the sleeve, a casing carried by the base and provided upon its periphery with a plurality of signal elements, said casing having its top open, a removable cap for the open top of the casing, an electric bulb removably mounted within the upper end of the sleeve and adapted to be passed through the open end of the casing, a light guard removably mounted upon the upper portion of the sleeve and adapted to be moved through the open end of the casing, and means to turn the casing.

7. In an automobile signal device, a substantially vertical support, an integral casing provided upon its periphery with signal elements integral therewith, means for pivotally mounting the casing about the support, a removable cap for the upper open end of the casing, an electric bulb removably mounted upon the upper end of the support, and a light guard removably mounted upon the upper end of the support.

8. In an automobile signal device, a casing provided upon its periphery with signal elements and having an opening in one end, a source of light held within the casing and adapted for removal through said opening, a top for the casing, and a resilient clamp detachably connecting the top and casing; said clamp having a contractible annular portion for insertion within the top and resilient fingers for engaging within the casing.

In testimony whereof I affix my signature.

RISTUM J. MJAHICE.